Sept. 11, 1962   J. B. PLATNER   3,053,241
HIGH TORQUE V-8 ENGINE
Original Filed Jan. 8, 1954   4 Sheets-Sheet 4

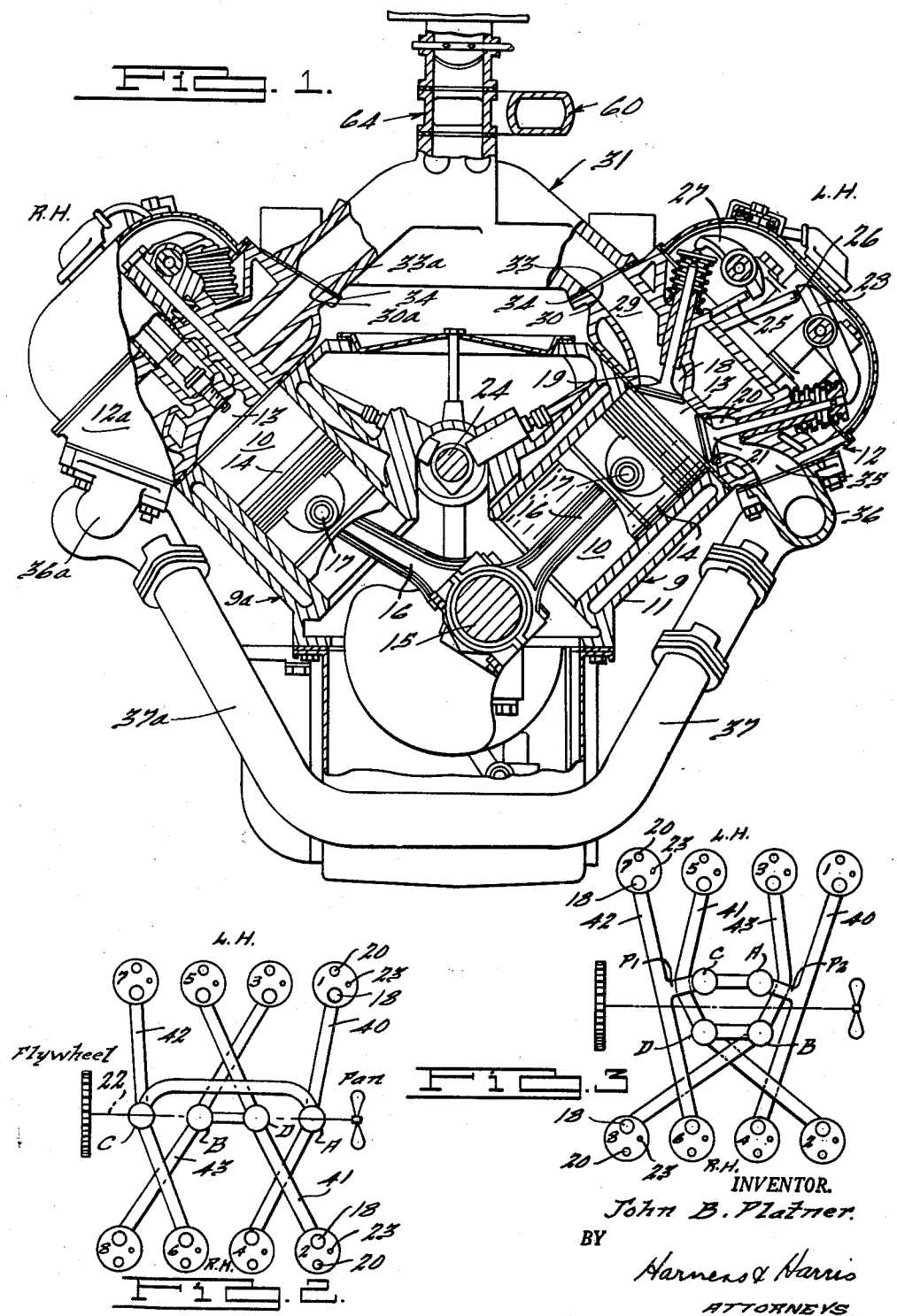

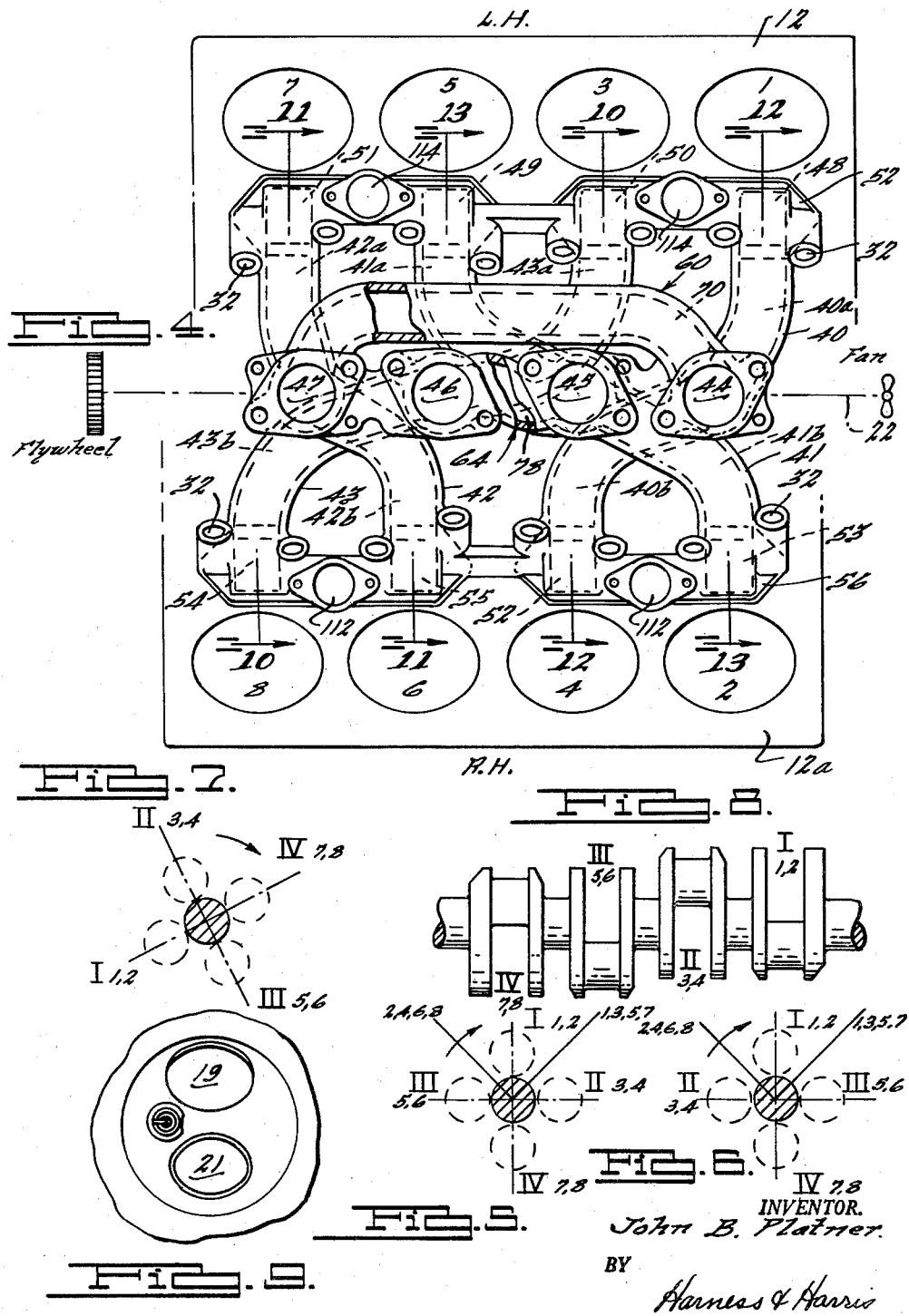

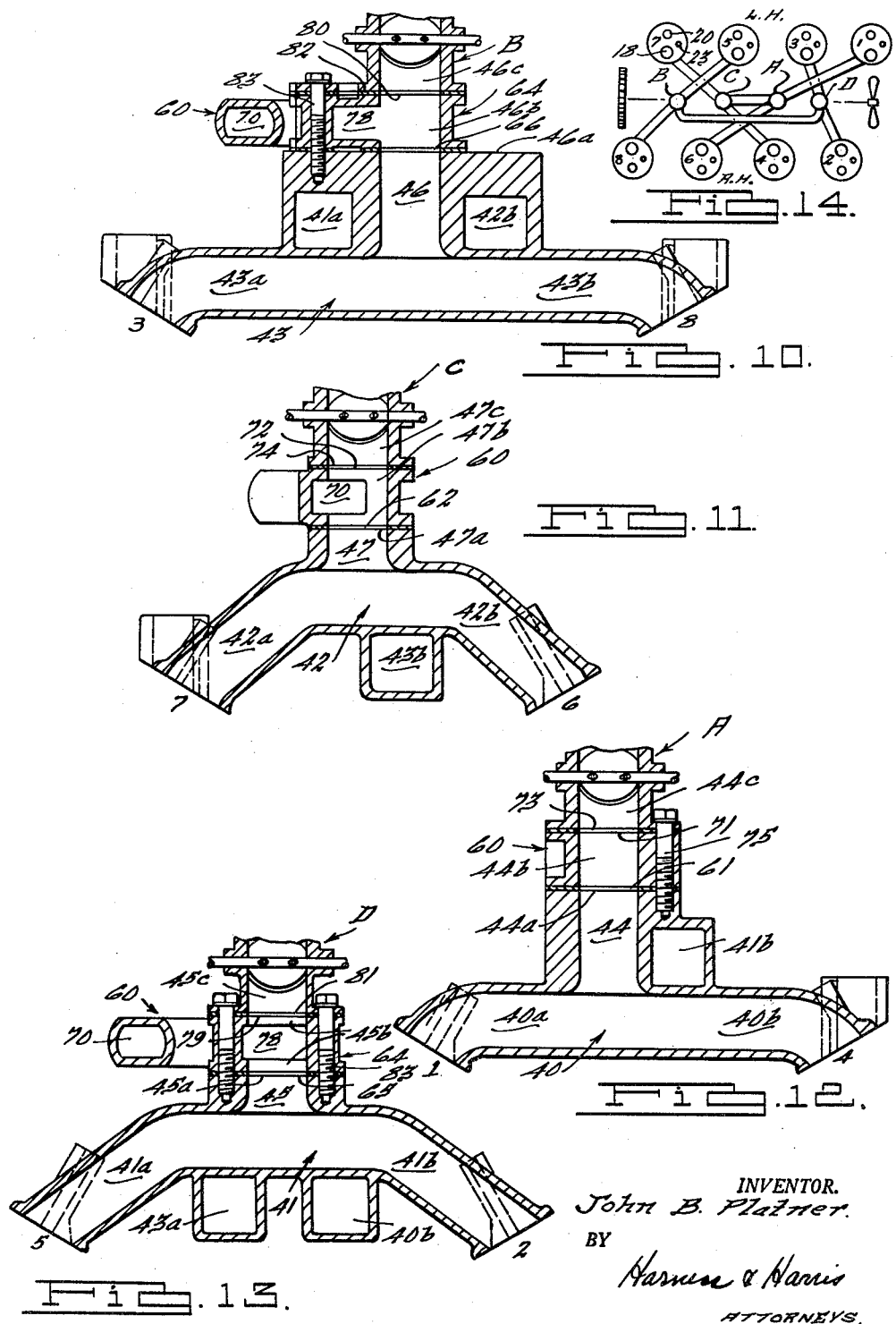

INVENTOR.
John B. Platner
BY
Harness & Harris
ATTORNEYS.

United States Patent Office 3,053,241
Patented Sept. 11, 1962

3,053,241
HIGH TORQUE V-8 ENGINE
John B. Platner, Detroit, Mich., assignor to Chrysler Corporation, Highland Park, Mich., a corporation of Delaware
Original application Jan. 8, 1954, Ser. No. 402,876, now Patent No. 2,759,463, dated Aug. 21, 1956. Divided and this application Aug. 15, 1956, Ser. No. 604,155
5 Claims. (Cl. 123—122)

This invention relates to internal combustion engines for driving motor vehicles, particularly passenger cars, and which have intake manifolds including means for effectively using engine coolant liquid for heating the air fuel mixture distributed thereby.

It especially relates to V-engines providing high torque output in the mid speed (2500–3500 r.p.m.) range and substantial high power in the upper speed (4000 to 5000 r.p.m.) range and which include means for furnishing heat to the intake manifolds thereof in a manner assuring a minimum of power loss at full throttle output operation.

The present application is a division of my copending application Serial No. 402,876 filed January 8, 1954, now U.S. Patent 2,759,463.

An object of my invention is to provide an engine manifold which utilizes the hot liquid coolant of the engine circulatory system as the source of heat for warming the manifold riser and fuel distribution passage.

Another object is to provide an engine having a manifold as set forth in the preceding object wherein the hot liquid coolant is utilized in a manner minimizing power loss at full throttle power output operation.

Still another object is to provide the intake manifold of an engine having a liquid coolant circulatory system, with a liquid coolant receiving chamber straddling the area of intersection of the fuel intake riser and fuel distribution passages of the manifold and which chamber has liquid coolant intake and discharge means connecting with the circulatory system one of which means is provided with a thermostatic valve control.

A specific object is to provide a V-engine intake manifold with means for heating the same that utilizes hot coolant water of the engine circulatory system as a source of heat and which is controlled to furnish such water heat to the manifold in the region of the source of supply of fuel during the initial warmup period of the engine and thereafter to cut off the same when a predetermined temperature of the water has been reached.

The foregoing as well as other objects and advantages of our invention will be more apparent from the drawings taken in conjunction with the following description.

In the accompanying drawings:

FIGURE 1 is an end elevational view partly in section of a current V-8 type overhead valve engine embodying our invention and which engine is provided with downdraft carburetion;

FIGURE 2 is a schematic view illustrating the intake manifold of our invention as applied to a V-8 engine having a crank arrangement as in FIGURE 6 and utilizing four in line single carburetors as sources of supply of air-fuel mixture and provided with interconnector tubes between the inner pair of air-fuel riser passages and between the outer pair thereof respectively;

FIGURE 3 is a schematic view illustrating a modification of our manifold of FIGURE 2 as applied to a crank arrangement as in FIGURE 6 and utilizing four sources of supply of air-fuel mixture which may be a four-barrel carburetor and using interconnectors between pairs of the air-fuel mixture risers;

FIGURE 4 is a detailed plan view of the inlet manifold of our invention shown schematically in FIGURE 2, the opposed cylinder blocks being schematically shown, and parts of the manifold being broken away to illustrate the interconnector passages;

FIGURES 5 and 6 are schematic views of two suggested two-plane 90° crank pin arrangements for an engine utilizing our invention, the Roman numerals in the figures indicating the positioning of the crank throws counting from the front or fan end of the engine and the numerals indicating cylinder numbers whose pistons are connected with the crank throws;

FIGURES 7 and 8 are respectively end and side elevational views of the 90° crank of FIGURE 5;

FIGURE 9 is a plan view looking upwardly into the hemispherical combustion chamber of one cylinder of the engine of FIGURE 1 and showing the relative location of the intake and exhaust valves and the sparking means therein;

FIGURE 10 is a developed transverse sectional elevation of the manifold structure of FIGURE 4 taken at 10—10 of FIGURE 4 and showing part of a carburetor and the riser and branch passage means connecting same with a pair of cylinders;

FIGURE 11 is a similar developed transverse sectional elevation taken at 11—11 of FIGURE 4 illustrating part of another carburetor and associated passage means connecting with another pair of cylinders;

FIGURE 12 is a similar developed sectional elevation taken at 12—12 of FIGURE 4 showing a third carburetor and associated passage means connecting with a third pair of cylinders;

FIGURE 13 is a similar developed sectional elevation taken at 13—13 of FIGURE 4 showing a fourth carburetor and associated passage means connecting with a fourth pair of cylinders;

FIGURE 14 is a schematic view of a manifold arrangement similar to that of FIGURE 2 but which is a mirror image thereof and corresponds to that used with the crank arrangement of FIGURE 5;

Figure 15:
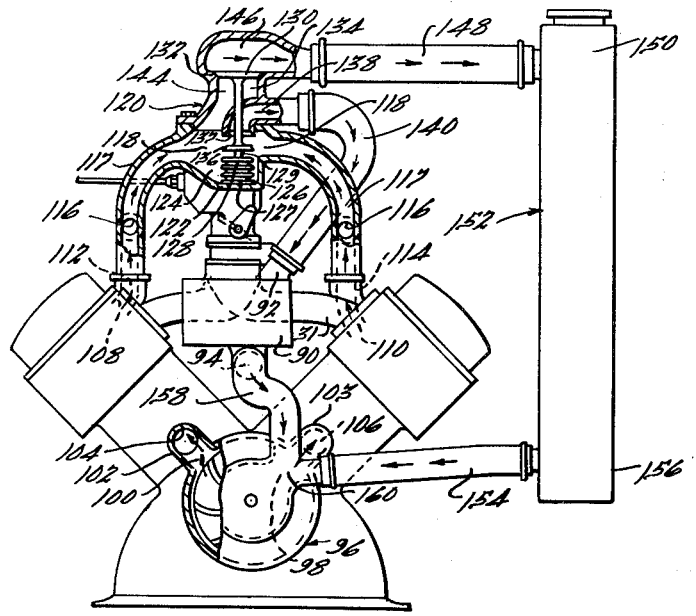
FIGURE 15 is an elevational view of the engine of FIGURE 1 illustrating our invention provided with a hot water system and means for preheating the fuel-air conducting passages of the manifold of FIGURE 4, portions of the system being shown in section.

For the purposes of illustration, our invention will be described relative to a 90° V-8 engine of current manufacture having a so-called 90° crankshaft, hemispherical combustion chambers and provided with four single downdraft carburetors each arranged to feed an end cylinder of one bank and an inner cylinder of the opposite bank at intervals of 360° of crank rotation and having interconnections between the risers of pairs of the carburetors feeding the inner cylinders of the same bank.

It will be understood, however, that our invention is applicable to other V-8 engines, for example to V-8 engines utilizing as fuel-air supply sources a single or plurality of quadruple barrel carburetors or a pair of multiple of dual barrel carburetors or combinations of the foregoing. However, the carburetors may be of the downdraft, updraft or horizontal types.

Referring now to the drawings wherein similar numerals are used to designate similar parts of the structure, FIGURE 1 shows a cross section of a V-8 engine of current manufacture, for example one having a 3.812 inch bore, a 3.625 piston stroke, and a 331 cu. in. displacement, to which our invention has been applied.

As seen in FIGURES 1 and 4, the engine has two banks 9 and 9ᵃ of cylinders 10 four in each bank, arranged at 90° in a cylinder block 11 to which cylinder heads 12 and 12ᵃ are secured and provided with hemispherical combustion chambers 13 immediately over each cylinder 10. The cylinders of each bank are aligned longitudinally of the axis of the engine and the cylinders of the opposite banks are offset longitudinally relative to each other. For convenient reference, the cylinders of the left hand cylinder bank which is to the left looking forwardly from the flywheel end of the engine are numbered 1, 3, 5, and 7 respectively, starting such numbering at the opposite or fan end of the engine, and those of the right cylinder bank are numbered 2, 4, 6, and 8 respectively, these numerals appearing internally of the cylinder representations in FIGURES 2, 3, 4, and 14.

Each cylinder is provided with a piston 14 reciprocable therein and operably connected to a crankshaft 15 through a connecting rod 16 and wrist pin 17. Crankshaft 15 is a 90° crankshaft as seen, for example in FIGURES 5, 6, 7 and 8 wherein the double crank throws identified by the Roman numerals I, II, III, and IV are arranged 90° apart as viewed in FIGURES 5, 6, and 7 with throws I and II being respectively opposite throws IV and III. As noted in FIGURE 8, throw No. I connects with the pistons of cylinders 1 and 2, throw No. II with the pistons of cylinders 3 and 4, throw No. III with the pistons of cylinders 5 and 6, and throw No. IV with the pistons of cylinders 7 and 8. It will be seen that throw III may be 90° of crank rotation counting clockwise in FIGURE 5 from throw I or by interchanging throws II and III throw II may be arranged 90° of clockwise rotation from throw I.

Various firing orders are possible for the two described crank arrangements while affording the feeding intervals essential in the manifold for high torque in the mid speed range of operation and high power in the high speed range of operation. Thus firing orders 1–5–7–3–6–8–4–2
1–5–4–3–6–8–7–2
1–8–7–3–6–5–4–2
1–8–4–3–6–5–7–2
1–8–4–2–6–5–7–3
1–8–7–2–6–5–4–3
1–5–4–2–6–8–7–3
1–5–7–2–6–8–4–3 would be used with the crank of FIGURES 5, 7, and 8 and manifold of FIGURE 14; and firing orders 1–3–7–5–4–8–6–2
1–3–6–5–4–8–7–2
1–8–7–5–4–3–6–2
1–8–6–5–4–3–7–2
1–8–6–2–4–3–7–5
1–8–7–2–4–3–6–5
1–3–6–2–4–8–7–5
1–3–7–2–4–8–6–5 used with the crank arrangement of FIGURE 6 and manifold of FIGURES 2, 3, and 4.

With any of these firing orders each of the two cylinders primarily fed by the supply sources A, B, C, and D respectively will have their suction strokes 360° out of phase with each other. Thus for example with the firing order 1–3–7–5–4–8–6–2 the cylinders 1 and 4 drawing from the supply source A of FIGURES 2 and 3 will have their suction strokes at regular intervals and 360° out of phase. The same will be true of the cylinders 3 and 8 drawing from the supply source B; the cylinders 7 and 6 drawing from the supply source C and the cylinders 5 and 2 drawing from the supply source D. Moreover, there will be regular intervals of 180° between the suction strokes of cylinders feeding from the connected supply sources A and C or B and D and regular intervals of 90° between the suction strokes of cylinders feeding from the non-connected sources A and B, primary-secondary pair A and C, the primary-secondary pair B and D and between the non-connected sources C and D of these pairs.

Thus it is to be noted that in the exemplified firing order aforesaid the suction cycle starts with the cylinder 1 drawing from A—C (A being the primary source and C the secondary), and is followed in sequence by cylinder 3 drawing from B—D; 7 drawing from C—A; 5 drawing from D—B; 4 drawing from A—C; 8 drawing from B—D; 6 drawing from C—A and 2 from D—B. Repetition occurs only at 360° intervals. The same is true of all other firing orders referred to above.

The hemispherical combustion chambers or cavities 13 of the cylinders 10 are by preference each provided with a single inlet opening 18 closed by an inlet valve 19 and with a single smaller exhaust outlet 20 closed by an exhaust valve 21, these valves being arranged transversely of the longitudinal axis 22 of the engine and at a substantial angle, for instance 60° to each other, and on a great arc of the spherical segment forming the combustion chamber 13. As seen in FIGURES 2, 3, and 14, all of the inlet openings 18 are in longitudinal alignment and all of the exhaust openings 20 are similarly arranged. Moreover, a single sparking means 23 is positioned in each chamber intermediate the valves thereof on a great arc of the chamber, all of the sparking means of each bank being in longitudinal alignment.

The inlet and exhaust valves of both banks of the engine are operable from a single camshaft 24 located above the crankshaft 15, the camshaft actuating suitable tappet mechanism associated with the push rods 25 and 26 of the inlet and exhaust valve mechanism which in turn actuate respectively the inlet valve rocker arm 27 and exhaust valve rocker arm 28, these rocker arms actuating in turn the normally spring held closed valves 19 and 21. By preference, the camshaft 24 is arranged to open the respective inlet valves 19 before top dead center position of the piston and to close the exhaust valves after top dead center position of the piston so as to maintain the intake valve open during a large portion of crank rotation and to maintain the exhaust valve open long enough to obtain an overlap between opening of the inlet valve and closing of the exhaust valve of each cylinder. By preference a camshaft having a 270° intake cycle, a 260° exhaust cycle, and 50° of overlap will be employed.

As seen in FIGURE 1, the intake valve openings 18 and the intake valves 19 for the cylinders of each bank are located at the inner terminus of air intake passages or ducts 29 leading transversely from the angularly disposed manifold mounting faces 30, 30ᵃ of the cylinder heads 12, 12ᵃ respectively upon which the intake manifold of my invention generally designated by the numeral 31 is mounted through bolt holes 32 (see FIGURE 4) by suitable bolts (not shown). The manifold has mounting faces 33, 33ᵃ complementary to the head faces 30, 30ᵃ respectively, and which seat on the latter through intervening gaskets 34.

The heads 12, 12ᵃ are also provided with exhaust passages 35 leading transversely from the exhaust inlets 20 and connecting with longitudinally extending exhaust manifolds 36, 36ᵃ which connect with suitable conduits 37, 37ᵃ that conduct the exhaust gases to the atmosphere by means not shown.

Figure 16:
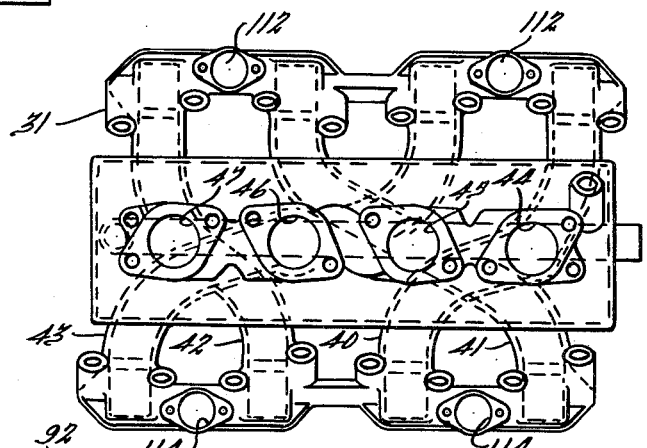
FIGURE 16 is a plan view showing the manner of applying hot water to the exterior of the passages of the manifold of FIGURE 4.
Figure 17:
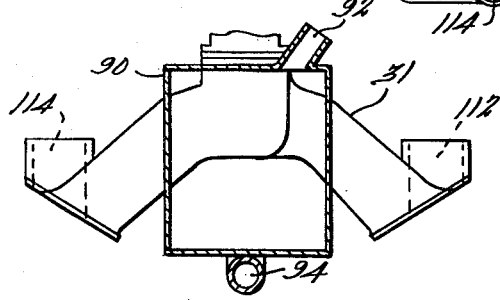
FIGURE 17 is an end elevational view of the structure of FIGURE 16, the heat supply structure being shown in section, to illustrate the hot water inlet and outlet passages.

Suitable means shown in FIGURES 15–17 inclusive and hereafter described, are provided for initial hot water preheating of a predetermined section of the intake manifold 31 passages when such heating is deemed desirable, for example, as is usual in the case of passenger car engines.

The intake manifold structure or system of FIGURES 2 and 4 comprises four individual passage means, ducts or conduits preferably of generally rectangular section, extending generally transversely of the engine axis 22. These conduits are generally designated by the numerals 40, 41, 42, 43, and as seen in FIGURES 4, 10, 11, 12, and 13 are each by preference provided at their top sides with circular inlet apertures or short vertical cylindrical riser passages, ducts, or conduits 44, 45, 46, and 47 respectively all of which by preference intersect with their respective transverse conduits on the axis 22 of the engine. These risers in effect divide each conduit into two branches extending to cylinders of opposite banks.

Thus branch passages, conduits or ducts 40ª, 41ª, 43ª and 42ª extend from the risers 44, 45, 46, 47 respectively to conduct the air-fuel mixture to the intake passages 29 of the cylinders 1, 5, 3 and 7 respectively of the left hand bank 12 of cylinders, these branch ducts terminating in rectangular outlet apertures 48, 49, 50, and 51 in the face 33 of the elongated mounting flange 52 of the manifold 31 and which apertures coincide with the rectangular inlets of the passages 29.

Similarly the branch passages, conduits or ducts 40ᵇ, 41ᵇ, 43ᵇ, and 42ᵇ extend from the risers 44, 45, 46, 47 respectively to the intake passages 29 of the cylinders 4, 2, 8, and 6 respectively of the right hand bank 12ª of cylinders, these branch ducts terminating respectively in rectangular outlets 52, 53, 54, 55 the face 33ª of the elongated mounting flange 56 of the manifold 31.

The conduits 40, 41, 42, 43 as seen in the plane of FIGURE 4, do not connect with directly opposite cylinders but preferably connect with diagonally adjacent disposed opposite cylinders, and preferably such that the pair of branches of each conduit are of substantially the same length. Thus the conduits 40 and 42 extend from inner cylinders of the right hand bank to the nearest adjacent end cylinder of the opposite bank, while the conduits 41 and 43 extend from inner cylinders of the left hand bank to the most remote cylinder of the opposite bank. Moreover, the branches are preferably similarly but oppositely curved such that the conduits as a whole are shaped in the form of a reverse curve having congruent branches leading from the engine axis 22.

The shaping is advantageous since it permits the branches to be made of suitable length for obtaining harmonic resonant tuning in the intake passages as described in the copending applications of Platner et al., Serial Nos. 297,318 and 373,376 filed July 5, 1952 and August 10, 1953 respectively, now U.S. Patents 2,766,743 and 2,791,205 respectively, where there is provided an empirical formula $$L = 72\frac{C}{N}$$

as the tool for approximately determining the length of the intake system. As there shown, L represents the intake passage length in inches from the air entrance of the air horn of the fuel mixing means to the intake valve of the cylinder it feeds measured on the axes of the passages, ports, risers, etc. comprising the intake or inlet system. N is the engine speed in r.p.m. at which the engine output is to peak, and C is the velocity of sound in feet per second in the intake passage under the particular temperature and pressure conditions expected therein. Also there described in an alternate more practical formula for determining L, to wit, $$L = 72\frac{C}{N} \pm 3$$

where all values for a carburetted engine as here disclosed are the same as above.

As seen in FIGURE 4 the conduits 41 and 43 cross each other adjacent the left hand bank 12 of the engine (left hand side of axis 22) and intermediate the inner pair of cylinders 3 and 5 of that bank to form in effect a letter X the branch 43ª underlying the branch 41ª where the conduits cross (see FIGURES 10 and 13). Moreover, the conduit 40 crosses the conduit 41 adjacent the right hand bank side of the axis 22 and intermediate the pair of adjacent cylinders 2 and 4 of the right hand bank 12ª to form a letter X and the conduit 42 crosses the conduit 43 at the same side of the axis 22 and intermediate the cylinders 6 and 8 of right hand bank 12ª to form a letter X. In these latter crossings the branch conduit 43 underlies the branch conduit 42ᵇ (see FIGURES 10 and 11) and the branch conduit 40ᵇ underlies the branch conduit 41ᵇ (see FIGURES 12 and 13).

In each instance the overlying conduit in the transverse vertical plane is substantially of an inverted U shape and has a short horizontal portion where it crosses the underlying conduit whereas the underlying conduit is generally horizontal and straight curving down at the ends to meet the entrances of the passages 29. Where the cross conduits intersect, their wall portions preferably provide common walls for the conduits.

In some cases, as in FIGURE 3, where two dual carburetors or a four-barrel carburetor are employed, the individual barrels may not conveniently, as in the preferred form of manifold of FIGURE 4, arrange themselves such that they are located at the intersections of the side branches of the manifold which they feed. In such cases short primary branches $P_1$, $P_2$ are provided leading from the vertical carburetor risers to the intersections of the main branches and these primary branches preferably are at substantially right angles to the direction of the main branches to assure uniform air-fuel mixture distribution, and preferably are in the same plane as the intersection of the main branches.

In FIGURE 3 only two primary passages $P_1$ and $P_2$ are shown, these leading from the vertical riser passages corresponding to the risers 44 and 47 of FIGURE 4 which connect with the air-fuel sources A and C, as seen in FIGURES 12 and 11 respectively. It will be understood that similar primary passages may be provided leading from the vertical risers 45, 46 connecting with the sources D and B respectively. Moreover, in connection with the FIGURE 3 manifold arrangement using two dual or a four-barrel carburetor it will be observed that the main branch passages form three letters X as with the FIGURE 2 form of manifold but differ in that the branch passages from the sources B and D to the cylinders 8 and 2 respectively, more suitably cross each other at the right hand bank side of the engine, that is to say, at the same side that the other two letters X are formed.

It has been stated above that the power output of the engine in the high speed range of operation may be improved substantially without adversely effecting the optimum torque output in the mid speed range of operation by interconnector passages between certain pairs of sources of supply of air-fuel mixture. This is shown schematically in FIGURES 2, 3, and 14 and structurally in FIGURES 1, 4, and 10 to 13 inclusive.

Thus as seen in FIGURE 4, an interconnector conduit or pipe generally designated by the numeral 60, of generally inverted U shape, seats upon the faces 44ª and 47ª of the risers 44 and 47 of the manifold 31 through intervening gaskets 61, 62 and interconnects these risers. Similarly, an interconnector conduit or pipe 64 seats upon the faces 45ª and 46ª of the risers 45 and 46 through intervening gaskets 65, 66 and interconnects them.

The interconnector member 60 includes a horizontal passage 70, preferably of generally rectangular section, which opens at each end into vertical circular riser passages 44ᵇ, 47ᵇ forming continuations of the manifold riser passages 44 and 47 respectively, and these passages 44ᵇ and 47ᵇ connect respectively with the air-fuel mixture chambers or barrels 44ᶜ and 47ᶜ of the sources A and C shown here as downdraft carburetors which seat upon faces 71, 72 of the interconnector member 60 through intervening gaskets 73, 74 respectively, and are held together with the interconnector member 60 to the manifold 31 by bolts 75 (FIGURE 12).

The interconnector member 64 includes a horizontal passage 78 which opens at each end with vertical riser passages 45ᵇ and 46ᵇ forming continuations of the manifold riser passages 45 and 46 respectively and these passages 45$^b$ and 46$^b$ connect respectively with the air-fuel mixture chambers or barrels 45$^c$ and 46$^c$ of the sources D and B also shown as downdraft carburetors which seat upon faces 79, 80 of the interconnector member 64 through intervening gaskets 81, 82 respectively and are held together with the interconnector member 64 to the manifold 31 by bolts 83 (FIGURES 10, 13).

The interconnector passages 70 and 78 are preferably of the same cross-sectional shape and area as the branch conduit passages of the manifold. Preferably the cross-sectional area of these passages will not be under 25% of that of the branch conduit passages such that the full advantage of the interconnector members in improving induction charging will be obtained.

It will be observed that the passages in FIGURE 14 have an arrangement which is substantially a mirror image of that in FIGURE 2 making it necessary that they connect with differently numbered cylinders of the opposite banks and with the crank arrangement of FIGURE 5 will utilize firing orders set forth for such crank arrangement above whereas the manifold arrangement of FIGURES 2 and 3 using the crank arrangement of FIGURE 6 will employ the firing orders set forth above for such crank arrangement.

With the interconnector members in use it will be noted that one pair of conduits, for example 40 and 42 in FIGURES 2, 3, and 4 form in effect a letter H whereas the other pair of conduits 41 and 43 form in effect a combined letter X and letter A. These configurations, that is to say a letter H and A combined letter X and A, serve to identify manifolds capable of carrying out the features of my invention.

Taking a typical operation of the manifold of FIGURES 2 and 4 of my invention with a 90° crank as in FIGURE 6 and a firing order of 1–3–7–5–4–8–6–2 described above, it will be evident that each of the sources A, B, C, D, respectively will receive equal regular suction impulses every 360° of crank rotation and that the spacing of the suction impulses of the connected sources A and C will be 180° of crank rotation and the same will be true of the connected sources B and D. Moreover, the paired cylinders connecting any one source, for instance the cylinders 1 and 4 connected to the source A will provide suction impulses on the source A at regular equal spaced intervals of 180° of crank rotation between them so that no connected sources for instance A and C or B and D will have immediately succeeding suction impulses.

The foregoing conditions will occur with each of the firing orders described above using the crank arrangements of FIGURE 5 or FIGURE 6, as the case may be, and each will provide the advantages of optimum torque output in the mid speed range and high power in the high speed range of operation, which will only be obtained when these relationships are met.

In certain arrangements where the manifold of the invention is employed in connection with passenger car engines, it may be desirable to provide some means for assuring a minimum of power loss at full throttle output operation. For this purpose I have provided a novel arrangement which utilizes hot water of the circulatory system as the source of heat and which is controlled to furnish heat to the manifold passages surrounding the sources of supply of air-fuel mixture during the initial warm-up period and thereafter to be cut off when a predetermined temperature of the water has been reached.

FIGURES 15 to 17 show the manner of associating such a mechanism with the manifold of my invention. In these figures the numeral 90 represents a hollow chamber attached by suitable means such as welding to the manifold 31 and which in effect boxes in, the central portions of the conduits 40 through 43 inclusive as well as a portion of the vertical risers 44 through 47 inclusive. This chamber is provided with a water inlet 92 and a water outlet 94 and these are connected with the usual water cooling system of the engine which will be first described.

Thus a pump 96 having an intake or suction side 98 and a pressure or output side 100 pumps water to water conduits 102, 103 which conducts the cold water to the inlets 104, 106 of the opposite cylinder blocks of the engine where the water circulates about the cylinder walls and is heated. The water then leaves the cylinder blocks at points, 108, 110, passes through the water passages 112, 114 of the manifold 31 (see FIGURE 16) there being four of these passages. These passages connect with water return headers 116 which extend by conduits 117 to the inlet side 118 of a bellows-type thermostatic valve generally designated by the numeral 120.

The thermostatic valve includes a casing 122 forming a chamber 124 wherein hot water may circulate around and past the conventional bi-metallic bellows 126. One end 127 of the bellows is anchored to the casing 122 and the opposite end 128 connected with a valve operating rod 129 which in FIGURE 15 is movable up and down in response to contraction and expansion of the accordion section of the bellows 126. The rod 129 carries at one end a tapered poppet valve member 130 which normally seats on a valve seat 132 and closes a water outlet port 134. The rod 128 also includes a poppet valve member 136 which on upward movement of the rod 129 to open port 134 is adapted to seat against a valve seat 137 to close a port 138 which connects by a suitable water conduit 130 with the water inlet 92 of the hot water chamber 90. The hot water may pass from the chamber 124 into the space 144 between the valves 130 and 136. Above the valve 130 is a water chamber 146 which connects by a suitable water conduit 148 with the top 150 of the vehicle water cooling radiator generally designated by the numeral 152. A return line 154 connects the bottom 156 of the radiator 152 with the pump inlet 98. Moreover, a water return is provided between the water discharge outlet 94 of the chamber 90 and the pump inlet 98 by a conduit 158 which cuts into the conduit 154 adacent the water inlet 98 of the pump as at 160.

In operation of the control device the poppet valve 130 is normally held closed on its seat 132 and when the pump is operated by the engine by means not shown for instance the engine crankshaft, water from the radiator is circulated by the pump through the conduits 102, 103 to the right and left cylinder blocks of the engine entering at the inlets 104, 106 and discharging through the manifold water passages 112, 114 into the return headers 116. In passing through the engine cylinder blocks the water becomes heated, then enters the thermostatic valve structure at the inlet 118, passes through the space 124 and out the outlet 138 through the conduit 140 to the chamber inlet 92 and into the chamber 90 where it circulates around the manifold passages 40 through 43 inclusive and the risers 44 to 47 inclusive after which it discharges through the outlet 94 and returns to the pump by the conduit 158. At this time no water is returned to the radiator by the conduit 148 since the valve 130 is closed. Hence such water as exists in the radiator and cylinder blocks is circulated between the cylinder blocks, the thermostatic valve and the chamber 90 by the pump 96. As the temperature of the water increases, i.e., becomes hotter, it acts upon the bi-metallic bellows 126 which causes the valve members 130, 136 to rise gradually until the temperature of the water is at a point where the valve 136 has moved sufficiently to close off the port 138 and completely open the port 134 of the valve mechanism whereupon circulation of water through the chamber 90 is stopped and water passes through the port 134 into the conduit 148 to the radiator from which it is returned to the pump by the conduit 154 and circulated by the pump through the cylinder block and back to the radiator through the thermostatic mechanism while bypassing the chamber 90.

From the above description it will be evident that I have provided a novel manifolding system whereby high torque is feasible in the mid range speeds of a V engine while still obtaining high power outputs in this range and at higher speeds.

To illustrate the possibilities of my invention, it may be noted that a 331 cu. in. engine having a 90° crank and the foregoing novel manifold system and using experimental interconnector passages provided with shut-off valves, gave when operated at a 7.6 compression ratio, 350.3 lb. ft. torque at 2800 r.p.m. and 227.6 H.P. at 4,400 r.p.m. with the interconnector passages out of use, and with the interconnections in operation gave 350.1 lb. ft. torque at 2,800 r.p.m., 250.9 H.P. at 4,400 r.p.m. and 251.3 H.P. at 4,800 r.p.m. From these figures it will be evident that a substantial increase in power in the high speed range was obtained without loss of torque output in the mid speed range. The same engine provided with cast interconnection passages without valve control operated at 8.1 compression ratio, gave 366 lb. ft. torque at 2,800 r.p.m. and 278.8 H.P. at 5,000 r.p.m.

I have further provided a novel arrangement for heating the manifold intake passages during cold starting and that will assure a minimum of power loss at full throttle output operation.

It will be understood that various modifications, changes and departures from the specific illustrated forms of the invention disclosed herein may be made and will occur to those skilled in the art without deviating from the letter and spirit of the present invention. For example, it will be understood that the invention is operable in connection with engines having updraft, downdraft or horizontal carburetors and slide valves may be employed in place of one or both poppet valves in the water heating system. It will be understood that all such modifications, changes, and equivalent structures within the scope of the appended claims are contemplated herein.

I claim:

1. The combination with an internal combustion engine having opposed banks of cylinders provided with a fluid cooling system and having an intake manifold extending lengthwise of the engine between said cylinder banks providing intake passages leading to the intake valves of said engine; of a fluid receiving chamber enclosing a central region of said manifold over its entire length which region includes portions of said passages, a fluid pump having an intake side and a discharge side, conduit means connecting said fluid cooling system of said engine banks with the discharge side of said pump, conduit means connecting said chamber with the intake side of said pump, valve means operable in response to temperature changes of the fluid, conduit means connecting said valve means with said fluid cooling system of the engine banks, conduit means connecting said valve means with said chamber, and conduit means including a heat exchanger connecting said valve means with the intake side of said pump.

2. An engine cooling system comprising a cooling jacket containing a coolant disposed in heat absorbing relation with the cylinders of said engine, heat dissipating means interconnected with said jacket, a pump for circulating said coolant through said jacket and said heat dissipating means, an intake manifold having distribution passages, fuel mixing means including a carburetor and a carburetor riser on said manifold for receiving said carburetor, said fuel mixing means having at least one fuel supply passage therein communicating with said distribution passages, a heating jacket in said manifold in heat exchanging relation with said distribution passages, passage means interconnecting said heating jacket with said cooling jacket, valve means disposed in said passage means and movable between two positions, said valve means when in one position directing the flow from said first jacket into said second jacket and to said pump bypassing said heat dissipating means and when in the other position directing said flow of coolant from said first jacket to said pump bypassing said second jacket.

3. In a vehicle having an engine provided with a bank of cylinders and a liquid coolant engine cooling system including a heat exchanger for dissipating heat from the liquid coolant, the said heat exchanger having an inlet and an outlet, the combination of a cooling jacket in said system in heat exchanging relation with said bank of cylinders, means for supplying a combustible mixture to said bank of cylinders, a heating jacket in heat exchanging relation with said supply means, connecting conduit means for interconnecting said cooling jacket with said heating jacket and with the inlet of said heat exchanger, heat responsive valve means disposed in said connecting conduit means and operable between two liquid flow cut-off positions, and further conduit means connecting said heating jacket with said cooling jacket bypassing said heat exchanger and connecting said cooling jacket with said outlet of said heat exchanger, said valve means when in one of its said two cutoff positions directing the flow of coolant liquid from the cooling jacket to said heating jacket and cutting off flow of coolant liquid between said cooling jacket and heat exchanger and when in the other of said two cut-off positions directing the flow of coolant liquid from said cooling jacket to said heat exchanger and cutting off flow of coolant liquid between said cooling jacket and heating jacket.

4. The combination with an internal combustion engine having a liquid coolant cooling system, a heat exchange unit for receiving liquid coolant from the cooling system and dissipating heat therefrom, said heat exchange unit having a liquid coolant inlet and a discharge outlet, a pump for maintaining flow of liquid coolant through said cooling system, said pump having an intake side and a discharge side, and an intake manifold having passage means for directing combustible mixture to the cylinders of said engine, of a liquid coolant receiving heating chamber in heat exchange relationship with said manifold passage means, said chamber having a liquid intake side and a liquid discharge side, conduit means connecting said liquid cooling system with said intake side of said heating chamber and with said inlet of said heat exchange unit, further conduit means connecting the liquid discharge side of said chamber with said engine cooling system through the intake side of said pump and bypassing said heat exchange unit and connecting said discharge outlet of said heat exchange unit with the intake side of said pump, thermostatic valve means disposed in said first mentioned conduit means for controlling liquid coolant flow to said heating chamber and said heat exchange unit, said valve means being automatically operable between two liquid coolant flow cut-off positions, said valve means when in one of said two cut-off positions directing the flow of liquid coolant fluid from said cooling system to said heating chamber and cutting off flow of coolant liquid between said cooling system and said inlet of said heat exchange unit and when in the other of said two cut-off positions directing the flow of coolant liquid from said cooling system to said inlet of said heat exchange unit and cutting off flow of coolant liquid between said cooling system and said heating chamber.

5. In a vehicle having an engine provided with a bank of cylinders and a liquid coolant engine cooling system including a heat exchanger for dissipating heat from the liquid coolant, the said heat exchanger having an inlet and an outlet, and a liquid pump for maintaining flow of liquid coolant through said cooling system, said pump having a liquid intake side and a liquid discharge side, the combination of a cooling jacket in said system in heat exchanging relation with said bank of cylinders, means for supplying a combustible mixture to said bank of cylinders, a heating jacket in heat exchanging relation with said supply means, first conduit means connecting said cooling jacket with said heating jacket, second conduit means connecting said cooling jacket with the inlet of said heat exchanger, third conduit means connecting said heating jacket with said cooling jacket through the inlet side of said pump and bypassing said heat exchanger, fourth conduit means connecting the outlet of said heat exchanger with the intake side of said pump and temperature responsive valve means for controlling liquid coolant flow to said heating jacket and to said heat exchanger, said valve means consisting of substantially simultaneously operable liquid coolant flow cut-off valves, one in said first conduit means and another in said second conduit means, each operable between a liquid coolant cut-off position and an open position, said one valve when in its said cut-off position directing the flow of liquid coolant from said cooling jacket to said heating jacket and cutting off flow of coolant liquid to said heat exchanger, and said other valve when in its said cut-off position directing the flow of liquid coolant from said cooling jacket to said inlet of said heat exchanger and cutting off flow of liquid coolant from said cooling jacket to said heating jacket, said one valve being open when the other is in its cut-off position, and said other valve being open when said one valve is in its cut-off position.

References Cited in the file of this patent

UNITED STATES PATENTS

| | | |
|---|---|---|
| 1,145,995 | Johnson | July 13, 1915 |
| 1,232,041 | Johnson | July 3, 1917 |
| 1,300,600 | Giesler | Apr. 15, 1919 |
| 1,660,609 | Fornaca | Feb. 28, 1928 |
| 1,822,147 | Horning | Sept. 8, 1931 |
| 2,005,869 | Meinzinger | June 25, 1935 |
| 2,049,596 | Timian | Aug. 4, 1936 |
| 2,523,611 | Clayton | Sept. 26, 1950 |
| 2,716,399 | Rothwell | Aug. 30, 1955 |

UNITED STATES PATENT OFFICE
CERTIFICATE OF CORRECTION

Patent No. 3,053,241                      September 11, 1962

John B. Platner

It is hereby certified that error appears in the above numbered patent requiring correction and that the said Letters Patent should read as corrected below.

Column 1, lines 50, 55, 58, 65 and 71, and column 2, lines 5, 50, 59, and 71, for "our", each occurrence, read -- my --; column 4, line 15, for "exahust" read -- exhaust --; column 5, line 59, for "in" read -- is --; column 6, line 4, for "43" read -- 43b --; column 8, line 6, for "blocks" read -- heads --.

Signed and sealed this 14th day of May 1963.

(SEAL)
Attest:

ERNEST W. SWIDER
Attesting Officer

DAVID L. LADD
Commissioner of Patents